UNITED STATES PATENT OFFICE.

HIERONYMUS GUSTAVE KRIEGER, OF CHICAGO, ILLINOIS, ASSIGNOR TO HIMSELF, HENRY A. BUSSIAN, AND ALBERT KONOLD, OF CHICAGO, ILLINOIS.

REDUCER FOR OVEREXPOSED PHOTOGRAPHIC PLATES.

SPECIFICATION forming part of Letters Patent No. 712,313, dated October 28, 1902.

Application filed July 10, 1902. Serial No. 115,092. (No specimens.)

*To all whom it may concern:*

Be it known that I, HIERONYMUS GUSTAVE KRIEGER, a citizen of the United States, and a resident of Chicago, in the county of Cook and State of Illinois, have invented a new and Improved Reducer for Overexposed Photographic Plates, of which the following is a full, clear, and exact description.

My invention relates to a reducer for overexposed photographic plates—that is, to a certain composition used for restoring the efficiency of photographic plates which have been exposed to light for such a long period that they are unfit for use in printing.

My improved reducer consists of a mixture of a saturated solution of copper sulfate four parts and ordinary hyhrochloric acid one part.

With the above-mentioned ingredients mixed in the proportions stated the reducer has a maximum strength. It may be diluted, however, to any desired extent, the only difference being that as the proportion of water is greater the strength of the reducer is proportionately lessened, and the fluid must act upon the plate for a longer period in order to produce the same result. I find that if the solution above mentioned be mixed with as much as ten times its weight in water it is still effective, but acts very slowly.

The solution being prepared, the plate after being developed in the usual manner is placed in the solution, preferably face upward. In a short time, proportionate, of course, to the strength of the solution and the degree of over exposure, the picture will gradually make its appearance. The plate is next taken out and cleansed quickly in water, after which it is placed in a strong solution of sodium thiosulfate, (hypo,) the proportion preferably being one of the solution to four of water. The plate is next taken out and dried in the usual manner.

The copper sulfate and hydrochloric acid change the color of the plate from a dark, approximating black, to a brown, and the thiosulfate brings back the dark color and at the same time makes the plate more transparent.

The advantages of my reducer over others include simplicity, quickness, cheapness, and reliability. I find that with this reducer a plate can be made to do good printing after an exposure in a camera for at least one minute under ordinary conditions. The clearness of plates treated with this reducer is remarkable.

With my reducer it is not necessary to soak the plate in water prior to placing the same in the solution.

Having thus described my invention, I claim as new and desire to secure by Letters Patent—

1. A reducer for overexposed photographic plates, comprising a mixture of a solution of copper sulfate and hydrochloric acid.

2. A reducer for overexposed photographic plates, comprising a liquid consisting of four parts by weight of a saturated solution of copper sulfate, and one part of hydrochloric acid.

In testimony whereof I have signed my name to this specification in the presence of two subscribing witnesses.

HIERONYMUS GUSTAVE KRIEGER.

Witnesses:
W. A. CARROLL,
JAMES BOGLE.